Patented Jan. 22, 1929.

1,699,731

UNITED STATES PATENT OFFICE.

JOHN LENNART ANDREN, OF BRIDGEPORT, CONNECTICUT.

PROCESS OF MAKING ALLOY STEELS.

No Drawing.     Application filed December 19, 1925.   Serial No. 76,493.

This invention relates to a process of making alloy steels, such as manganese, chromium, molybdenum, vanadium and the like, directly from the ores, and has for an object to provide a process in which steels are not only produced directly from the ores but also a process in which the proportion of the alloy metal and the carbon content can be approximately determined without the necessity of subjecting the product to a separate and distinct refining operation.

The usual processes of manufacturing alloy steels consist in melting down in an electric furnace a charge of pig iron and suitable scrap, and adding to the molten metal certain ferroalloys until the desired contents of the alloys are reached. The steel is poured from the furnace when the condition (temperature, slag and so forth) are favorable. Thus these processes consist briefly in remelting certain metals (pig iron, scrap, and ferroalloys) and adjusting the composition by additions later.

The manufacture of ferroalloys which usually contain a large percentage of the alloy, such as from fifty to ninety per cent, is commonly conducted in electric furnaces whereby ore, coal and if necessary certain slag forming materials, are charged in lots, usually three or four times per hour. The metal is tapped from the furnace at certain intervals, allowed to cool, crushed and shipped. The ferroalloys thus obtained always contain a considerable percentage of carbon, in some cases from four to seven per cent, and therefore, special expensive refining processes are necessary in order to lower this carbon content, as a lower carbon content is in some cases required, especially for making low carbon alloy-steels. This process for making ferroalloys is very similar to the blast furnace process except that the heat required is obtained from the electric arc and current.

In carrying out my process for making alloy steels I mix iron ore, ore containing the desired alloy and coal, all finely crushed, in certain variable proportions to give the desired relative content of the various elements in the resulting product. I then heat this mixture for a certain time sufficient to carry out the reduction of the ores whereby steel is obtained, at a temperature sufficiently high to reduce the ores but less than the melting temperature of the metals or the temperature at which they will dissolve carbon, and I also heat this mixture for this reducing reaction in a chamber or container in which the mixture can be heated by heat generated outside the mixture, by this I mean by heat generated independently of combustion in the mix, so that carbon cannot be dissolved by the metals during the reducing operation. Thus in my process the steel is produced directly from the ores in one single process and not by remelting metals such as pig iron, scrap and ferroalloy as in the old process, and it is obviously quite different from these old processes.

The proportions between the ores used are varied depending on the desired composition of the steel to be obtained, and just sufficient coal, charcoal or the like, is added to give the carbon required for reducing the ores and give approximately the desired carbon content in the finished product. The carbon will unite with the oxygen of the ores to reduce these ores at a temperature below the melting temperatures of the metals, and as the metals can only dissolve the carbon when melted this carbon is practically all used for reduction purposes, and therefore, we can secure a very low carbon content in the steel produced by this process, and if low carbon steels are desired it is not necessary to pass the steel secured through a further refining process to reduce the carbon content. Another reason why we can secure a low carbon content in this process is that combustion for heating the mixture does not take pace within the mixture, the heat being supplied from the outside, and therefore, none of the carbon is used up for generating heat to carry on the process, but it is used only for the reduction of the ores. It is not, therefore, necessary to add a surplus of coal or carbon to take care of this combustion, and we can approximate very closely the amount of coal to give the carbon required for reduction. If an electric furnace is used the heating is done outside the container and not by means of an arc in the mix, as in this case some of the coal would burn and we would not secure the proper reduction. If carbon (coal) were added to take care of this combustion then the temperature might be sufficiently high to melt the metals and some of the carbon would be dissolved by the metals and we would have a high carbon content. At the end of the reaction we get a solid mass of metal as the temperature may be just below the melting point, but after the ores are reduced and the coal or carbon practically used up the temperature may be increased to melt the metal alloy, and it can then be poured or tapped off. As the carbon has been used in the reduction process there will be no appreciable amount of free carbon left, and therefore, carbon will not be dissolved by the melted metals as there is no carbon to be dissolved, unless it is desired to secure a certain higher carbon content when the amount of carbon may be increased to give this surplus. This process, therefore, may be used to secure an alloy steel with a very low carbon content.

In mixing the ores and coal to secure the proper percentages of the various elements, impurities are, of course, taken into consideration. For instance, if a very low carbon steel is desired I use only slightly over the theoretical amount of carbon required for the reduction of the ores. If coal is used we have to take into account impurities such as ash, water, dirt and so forth, and therefore, add a little over the theoretical amount, say two or three per cent to allow for these impurities and give the right amount of carbon. As an example a mixture was prepared from eighty-five pounds of material containing about sixty-five per cent iron, fifteen pounds of material containing about sixty per cent chromium and fifteen pounds of charcoal. A portion of this mixture was heated in a crucible at about 2400° to about 2500° F. for about an hour. This is below the melting temperature of iron which is about 2770° F. At the end of this time a spongy metal containing about 10.66 per cent chromium was obtained with a very low carbon content. It is to be understood that this particular example is used merely for illustration.

It will thus be apparent from the foregoing description that with this process I am able to secure by a direct method alloy steels with a very low carbon content, although it may, of course, be used for higher carbon contents if desired, and I can secure these low carbon contents without the necessity of separate refining operation to reduce the amount of carbon. This greatly reduces the time and the cost required for the production of the steels. The mix (ores and coal) can be heated in pots and the product poured from these, or it can be heated in special furnaces making the process continuous.

The above examples are given for illustrative purposes and not by way of limitation, and it will be appreciated by those skilled in the art, that the operative conditions such for instance as the choice and proportions of the special reagents, will necessarily be adjusted according to circumstances of any particular case, and the type of furnace available.

Having thus set forth the nature of my invention what I claim is:

1. The process of making alloy steels which consists in heating a mixture of iron ore, ore containing the desired alloy and approximately the amount of coal required to reduce the ores and give the desired carbon content in the finished product, to a temperature sufficient to reduce the ores but less than the melting temperatures of the metals in a container by heat generated outside the mix, maintain the mixture at this temperature a sufficient time to reduce the ores, and then heating to a sufficient temperature to melt the resulting metals.

2. The process of making alloy steels which consists in mixing iron ore, ore containing the desired amount of alloy, and a sufficient amount of coal to reduce the ores and give the desired carbon content in the finished product, heating this mixture for a sufficient time to reduce the ores in a container by heat generated outside the mix, and then heating to a sufficient temperature to fuse the metals.

3. The process of making alloy steels which consists in mixing finely crushed iron ore, ore containing the desired alloy and sufficient coal to reduce the ores and give the desired carbon content in the finished product, heating this mixture to a temperature to reduce the ores, but less than the temperature at which the metals dissolve carbon in a container by heat generated outside the mix, and then heating to a temperature to melt the metals.

4. The process of making alloy steels which consists in heating a finely crushed mixture of iron ore, ore containing chromium and coal to a temperature above 2300° F. to reduce the ores but less than the temperature at which the metals dissolve carbon in a container by heat generated outside the mix, and then heating to a temperature to melt the metals.

5. The process of making alloy steels which consists in heating a finely crushed mixture of iron ore, ore containing chromium and sufficient coal to reduce the ores and give the desired carbon content in the finished product to a temperature sufficient to reduce the ores but less than the melting temperature of the metals in a container by heat generated outside the mix, and then heating to a temperature to melt the metals.

6. The process of making alloy steels which consists in mixing iron ore, ore containing the desired amount of alloy, and a sufficient amount of coal to reduce the ores and give the desired carbon content in the finished product, heating this mixture for a sufficient time to reduce the ores in a container by heat generated outside the mix to a temperature sufficient to reduce the ores but less than the melting temperatures of the metals, and then heating to a temperature to melt the metals.

7. The process of making alloy steels which consists in heating a mixture of iron ore, ore containing chromium and coal for a sufficient time to reduce the ores, in a container by heat generated outside the mix and at a temperature above 2300° F. and less than the melting point of iron, and then heating to a temperature to melt the metals.

8. The process of making alloy steels which consists in heating a mixture of iron ore, coal and ore containing chromium, in amount from 1% to about 30% of the mixture, in a container by heat generated outside the mix and to a temperature above 2300° F. to reduce the ores but less than the melting temperatures of the metals, and then heating to a temperature to melt the metals.

9. The process of making alloy steels which consists in heating a mixture of iron ore, ore containing the desired alloy and coal for a sufficient time to reduce the ores in a container by heat generated outside the mix and at a temperature above 2300° F. and less than the melting temperature of iron, and then fusing the metals.

10. The process of making alloy steels which consists in heating a mixture of iron ore, coal and ore containing the desired alloy, in amount from 1% to about 30% of the mixture, in a container by heat generated outside the mix and at a temperature above 2300° F. to reduce the ores but less than the melting temperatures of the metals, and then melting the metals.

In testimony whereof I affix my signature.

JOHN LENNART ANDREN.